US006603477B1

(12) United States Patent
Tittle

(10) Patent No.: US 6,603,477 B1
(45) Date of Patent: Aug. 5, 2003

(54) METHOD OF RENDERING A GRAPHICAL DISPLAY BASED ON USER'S SELECTION OF DISPLAY VARIABLES

(75) Inventor: Douglas L. Tittle, Willoughby, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 338 days.

(21) Appl. No.: 09/636,379

(22) Filed: Aug. 11, 2000

(51) Int. Cl.⁷ ............................................... G06T 11/20
(52) U.S. Cl. ................. 345/440; 345/440.1; 345/440.2; 345/441; 345/442; 345/443; 345/140
(58) Field of Search ................................. 345/440, 140, 345/440.1, 440.2, 441, 442, 443

(56) References Cited

U.S. PATENT DOCUMENTS

| 1,402,803 | A |   | 1/1922  | Smith                  |
|-----------|---|---|---------|------------------------|
| 4,319,347 | A | * | 3/1982  | Savit ............ 367/52 |
| 5,247,287 | A |   | 9/1993  | Jonker et al. ...... 345/134 |
| 5,261,031 | A | * | 11/1993 | Saito ............ 345/440 |
| 5,307,455 | A |   | 4/1994  | Higgins et al. ...... 395/140 |
| 5,462,438 | A |   | 10/1995 | Becker et al. ...... 434/430 |
| 5,485,564 | A |   | 1/1996  | Miura ............ 395/140 |
| 5,546,516 | A |   | 8/1996  | Austel et al. ...... 395/140 |
| 5,548,699 | A |   | 8/1996  | Ishida et al. ...... 395/140 |
| 5,557,716 | A | * | 9/1996  | Oka et al. ...... 345/440 |
| 5,680,560 | A |   | 10/1997 | Gaertner ...... 395/339 |
| 5,848,259 | A |   | 12/1998 | Pelfrey ........ 345/440 |
| 5,953,009 | A |   | 9/1999  | Alexander ...... 345/348 |
| 6,020,898 | A | * | 2/2000  | Saito et al. ...... 345/440 |
| 6,031,547 | A | * | 2/2000  | Kennedy ...... 345/440 |
| 6,054,984 | A |   | 4/2000  | Alexander ...... 345/339 |
| 6,055,480 | A | * | 4/2000  | Nevo et al. ...... 702/3 |
| 6,057,839 | A |   | 5/2000  | Advani et al. ...... 345/341 |
| 6,064,401 | A | * | 5/2000  | Holzman et al. ...... 345/440 |

FOREIGN PATENT DOCUMENTS

DE        2836500        3/1980

* cited by examiner

Primary Examiner—Matthew C. Bella
Assistant Examiner—Mike Rahmjoo
(74) Attorney, Agent, or Firm—Diane R. Meyers; Deborah M. Altman

(57) ABSTRACT

A method of plotting traces of data on two or more graphs, wherein each trace is related to the output of a process sensor, includes generating a list of sensors and grouping the sensors according to a unit of measure each sensor is configured to detect. One axis of a first graph is associated with the unit of measure of a first group of sensors and one axis of a second graph is associated with the unit of measure of a second group of sensors. Each sensor of the first group is associated with a trace to be displayed on the first graph and each sensor of the second group is associated with the trace to be displayed on the second graph. The traces are displayed on the first and second graphs, with each trace being related to the output of a sensor over time.

22 Claims, 4 Drawing Sheets

FIG. 2a

| INPUT ORDER | USER INPUT | |
|---|---|---|
| | SENSOR # | UNIT OF MEASURE |
| ↓ | 1 | A |
| | 2 | A |
| | 3 | B |
| | 4 | C |
| | 5 | A |
| | 6 | B |
| | 7 | C |
| | 8 | A |

FIG. 2b

| REORDERED USER INPUT | DISPLAY OUTPUT ASSIGNMENT | |
|---|---|---|
| SENSOR #/UNIT OF MEASURE | TRACE # | GRAPH #/ UNIT AXIS |
| 14 { 1/A | T1 | 1/W |
| 2/A | T2 | 1/W |
| 5/A | T3 | 1/W |
| 8/A | T4 | 1/W |
| 16 { 3/B | T5 | 2/Y |
| 6/B | T6 | 2/Y |
| 18 { 4/C | T7 | 2/Z |
| 7/C | T8 | 2/Z |

FIG. 3a

| INPUT ORDER | USER INPUT | |
|---|---|---|
| | SENSOR # | UNIT OF MEASURE |
| ↓ | 1 | A |
| | 2 | A |
| | 3 | B |
| | 4 | C |
| | 5 | C |
| | 6 | B |
| | 7 | C |
| | 8 | C |

FIG. 3b

| REORDERED USER INPUT | DISPLAY OUTPUT ASSIGNMENT | |
|---|---|---|
| SENSOR #/UNIT OF MEASURE | TRACE # | GRAPH #/ UNIT AXIS |
| 20 { 4/C | T1 | 1/W |
| 5/C | T2 | 1/W |
| 7/C | T3 | 1/W |
| 8/C | T4 | 1/W |
| 22 { 1/A | T5 | 2/Y |
| 2/A | T6 | 2/Y |
| 24 { 3/B | T7 | 2/Z |
| 6/B | T8 | 2/Z |

FIG. 4a — USER INPUT

| INPUT ORDER | SENSOR # | UNIT OF MEASURE |
|---|---|---|
| ↓ | 1 | A |
| | 2 | C |
| | 3 | A |
| | 4 | C |
| | 5 | B |
| | 6 | D |
| | 7 | D |
| | 8 | A |

FIG. 4b

REORDERED USER INPUT — SENSOR #/UNIT OF MEASURE:
- 26: 1/A, 3/A, 8/A
- 32: 5/B
- 28: 2/C, 4/C
- 30: 6/D, 7/D

DISPLAY OUTPUT ASSIGNMENT:

| TRACE # | GRAPH #/UNIT AXIS |
|---|---|
| T1 | 1/W |
| T2 | 1/W |
| T3 | 1/W |
| T4 | 1/X |
| T5 | 2/Y |
| T6 | 2/Y |
| T7 | 2/Z |
| T8 | 2/Z |

FIG. 5a — USER INPUT

| INPUT ORDER | SENSOR # | UNIT OF MEASURE |
|---|---|---|
| ↓ | 1 | A |
| | 2 | B |
| | 3 | D |
| | 4 | A |
| | 5 | A |
| | 6 | A |
| | 7 | C |
| | 8 | A |

FIG. 5b

REORDERED USER INPUT — SENSOR #/UNIT OF MEASURE:
- 34: 1/A, 4/A, 5/A, 6/A, 8/A
- 36: 2/B
- 38: 3/D
- 40: 7/C

DISPLAY OUTPUT ASSIGNMENT:

| TRACE # | GRAPH #/UNIT AXIS |
|---|---|
| T1 | 1/W |
| T2 | 1/W |
| T3 | 1/W |
| T4 | 1/W |
| T5 | 2/Y |
| T6 | 2/Z |
| T7 | N.D. |
| T8 | N.D. |

N.A. = NOT ASSIGNED
N.D. = NOT DISPLAYED

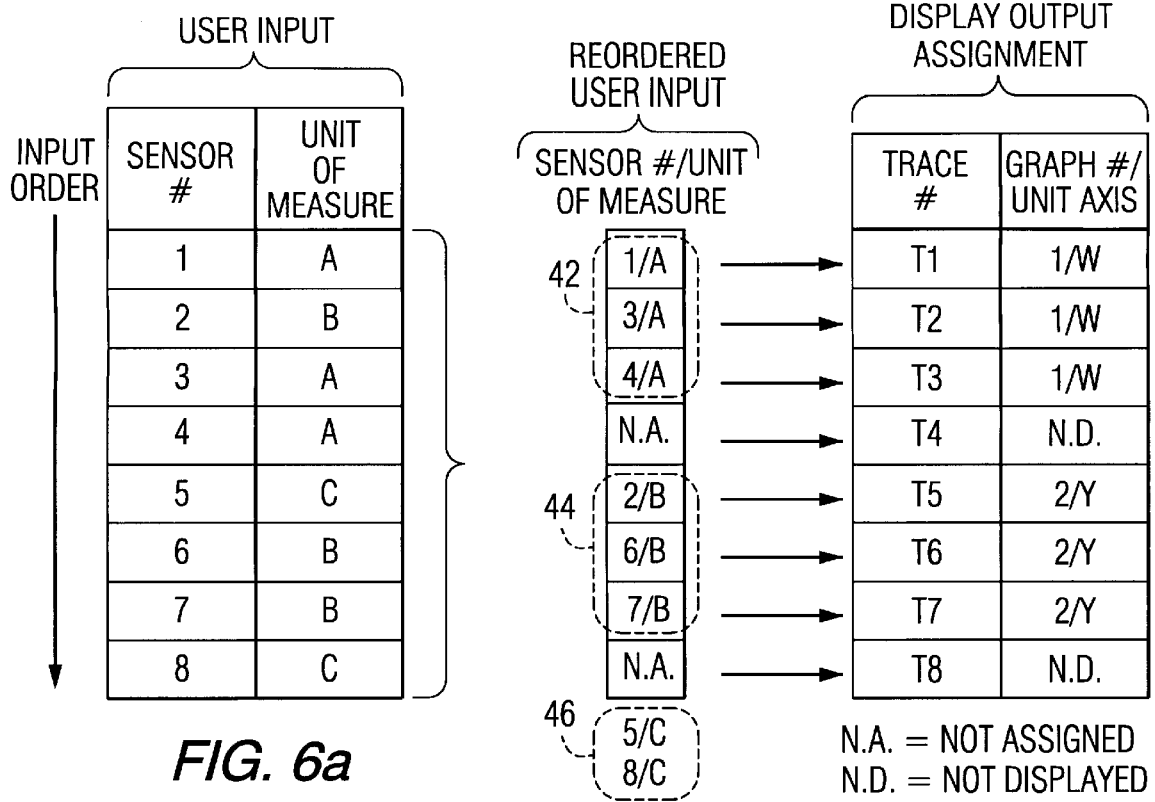
FIG. 6a
FIG. 6b
N.A. = NOT ASSIGNED
N.D. = NOT DISPLAYED
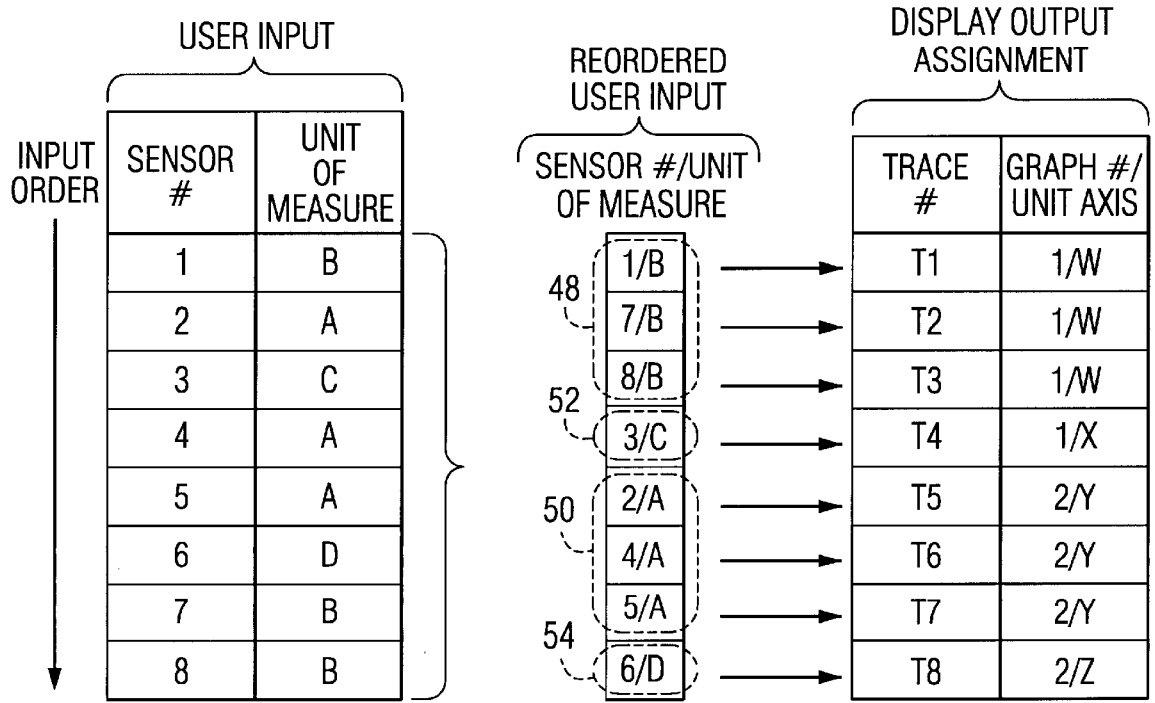
FIG. 7a
FIG. 7b

METHOD OF RENDERING A GRAPHICAL DISPLAY BASED ON USER'S SELECTION OF DISPLAY VARIABLES

BACKGROUND OF THE INVENTION

It is well-known in the art of automated process control to provide a process controller, such as a programmable logic controller or computer, for monitoring signals output by one or more sensors each configured to detect a process parameter and to provide to the controller a signal indicative thereof. The controller periodically records the signals output by the sensors for subsequent retrieval and analysis. If the controller includes a display, one or more plots or traces of the signals output by one or more of the sensors can be generated on the display to provide a dynamic visual indication of the process parameters being sensed by the sensors having their outputs displayed on the traces displayed on the display.

A problem with displaying traces corresponding to the output of sensors which monitor parameters of a process is that the selection of the vertical axis and the corresponding trace or traces to be displayed in connection therewith can be time consuming. In addition, confusing combinations of trace selections may result in the display of one or more graphs having confusing combinations of magnitude and/or units of measure, such as temperature, pressure, pH, conductivity, etc.

It is, therefore, an object of the present invention to provide a method of ordering the outputs of process sensors to be displayed on two or more graphs of a display as a function of a user selection of the sensor outputs to be displayed and the assignment of a unit of measure for each selected sensor and, more particularly, as a function of the number of sensor outputs per unit of measure. Still other objects of the invention will become apparent to those of ordinary skill in the art upon reading and understanding the following detailed description.

SUMMARY OF THE INVENTION

Accordingly, I have invented a method capable of displaying outputs of a plurality of process sensors on two or more graphs of a visual display. The method includes selecting in a desired order a plurality of sensors having outputs that are to be displayed by traces of two or more graphs of a visual display. The plurality of sensors selected is greater than the plurality of traces that can be displayed by each graph alone. A unit of measure is associated with each selected sensor and the sensors are grouped according to the units of measure. A first axis of a first graph is associated with the unit of measure of a first group of sensors, and outputs of the sensors of the first group are associated with traces of the first graph. A first axis of a second or greater number of graphs is associated with the unit of measure of a second or greater number of groups of sensors, and outputs of the sensors of the second or greater number of groups are associated with traces of the second or greater number of graphs. Traces associated with the outputs of the sensors are displayed on the first graph and the second or greater number of graphs as needed.

Preferably, each sensor in a group is ordered therein according to the order of its selection.

When the number of sensors of a third group of sensors is less than or equal to a number of traces of the first graph not associated with outputs of the sensors of the first group of sensors, a second axis of the first graph is associated with the unit of measure associated with the third group of sensors. The outputs of the sensors of the third group are associated with traces of the first graph not associated with outputs of the sensors of the first group. When the number of sensors of a fourth group of sensors is less than or equal to the number of the traces of the second graph not associated with outputs of sensors of the second group of sensors, a second axis of the second graph is associated with the unit of measure associated with the fourth group of sensors. The outputs of the sensors of the fourth group are associated with traces of the second graph not associated without outputs of the sensors of the second group.

When the number of sensors of the first group of sensors exceeds the number of traces that can be displayed on the first graph, a second axis of the second graph is associated with the unit of measure of the first group of sensors. The outputs of the sensors of the first group are associated with traces of the second graph not associated with outputs of the sensors of the second group of sensors.

Each grouping of sensors can include one or more sensors.

I have also invented a method of ordering and displaying the outputs of a plurality of process sensors on a plurality of time-based graphs displayed on a visual display. The method includes displaying on a visual display a first graph which is capable of displaying a first plurality of traces and a second graph which is capable of displaying a second plurality of traces. A list of sensors is generated and each sensor in the list is associated with a unit of measure that each sensor is configured to detect. The sensors in the list are grouped according to units of measure. A first axis of the first graph is associated with the unit of measure of a first group of sensors and a first number of the first plurality of traces are associated with a like number of sensors of the first group of sensors. A first axis of the second graph is associated with the unit of measure of a second group of sensors and a first number of the second plurality of traces is associated with a like number of sensors of the second group of sensors. Traces corresponding to the outputs of the associated sensors are displayed on the first and second graphs.

A second axis of the first graph is associated with the unit of measure of a third group of sensors. A second number of the first plurality of traces is associated with a like number of sensors of the third group of sensors. Preferably, the sum of the first number of the first plurality of traces and the second number of the first plurality of traces is less than or equal to the total of the first plurality of traces.

A second axis of the second graph is associated with the unit of measure of a fourth group of sensors. A second number of the second plurality of traces is associated with a like number of sensors of the fourth group of sensors. Preferably, the sum of the first number of the second plurality of traces and the second number of the second plurality of traces is less than or equal to the total of the second plurality of traces.

I have also invented a method of plotting traces of data on two or more graphs, wherein each trace is related to the output of a process sensor. The method includes generating a list of sensors and grouping the sensors according to a unit of measure each sensor is configured to detect. One axis of a first graph is associated with the unit of measure of a first group of sensors and one axis of a second graph is associated with the unit of measure of second group of sensors. Each sensor of the first group is associated with the trace to be displayed on the first graph and each sensor of the second group is associated with the trace to be displayed on the second graph. The traces are displayed on the first and second graphs, with each trace being related to the output of a sensor over time.

I have also invented a method of displaying outputs of a plurality of process sensors on a visual display capable of visually displaying two or more graphs. The method includes selecting in a desired order a plurality of sensors having outputs that are capable of being displayed by traces of two or more graphs of a visual display, where the plurality of sensors selected is greater than the plurality of traces that can be displayed by each graph alone. A unit of measure is associated with each selected sensor and the sensors are grouped according to the units of measure. An axis of one graph is associated with the unit of measure of one group of sensors and the outputs of the sensors of the one group of sensors are associated with traces of the one graph. An axis of another graph is associated with the unit of measure of another group of sensors when the plurality of sensors is greater than the plurality of traces that can be displayed by the one graph and the outputs of the sensors are of the other group of sensors are associated with traces of the other graph. The traces associated with the outputs of the sensors on the graphs are displayed on the display.

Lastly, I have invented a method of ordering and displaying the outputs of a plurality of process sensors on a plurality of time-based graphs displayed on a visual display. The method includes displaying on a visual display a plurality of graphs with each graph capable of displaying a plurality of traces. A list of sensors is generated and each sensor in the list is associated with a unit of measure each sensor is configured to detect. The sensors are grouped in the list according to units of measure. At least one axis of each graph is associated with the unit of measure of a group of sensors. A number of the plurality of traces of each graph are associated with one or more outputs of a like number of sensors of a group of sensors. The traces corresponding to the outputs of the associated sensors are displayed on each of the plurality of graphs.

BRIEF DESCRIPTION OF THE DRAWINGS

FIGS. 2a and 2b are diagrammatic drawings showing a first example in accordance with the present invention between user input of sensor numbers and units of measure and the corresponding display output assignment of trace numbers and unit axes;

FIGS. 3a and 3b are diagrammatic drawings showing a second example in accordance with the present invention between user input of sensor numbers and units of measure and the corresponding display output of trace numbers and unit axes;

FIGS. 4a and 4b are diagrammatic drawings showing a third example in accordance with the present invention between user input of sensor numbers and units of measure and the corresponding display output of trace numbers and unit axes;

FIGS. 5a and 5b are diagrammatic drawings showing a fourth example in accordance with the present invention between user input of sensor numbers and units of measure and the corresponding display output of trace numbers and unit axes;

FIGS. 6a and 6b are diagrammatic drawings showing a fifth example in accordance with the present invention between user input of sensor numbers and units of measure and the corresponding display output of trace numbers and unit axes; and FIGS. 7a and 7b are diagrammatic drawings showing a sixth example in accordance with the present invention between user input of sensor numbers and units of measure and the corresponding display output of trace numbers and unit axes.

DETAILED DESCRIPTION OF THE PREFERRED EMBODIMENT

Figure 1:
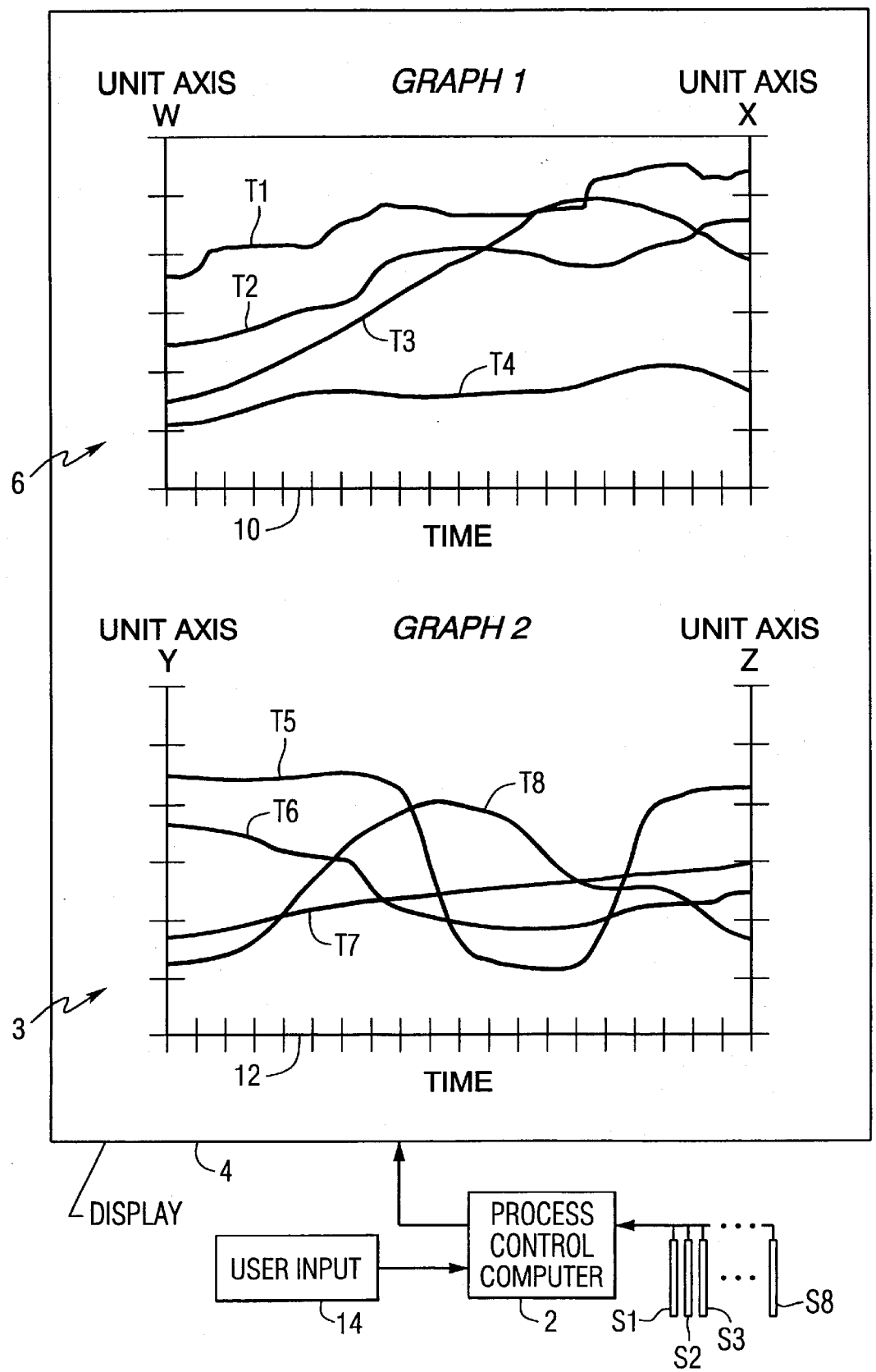
FIG. 1 is a schematic drawing of a process control system having a process control device, for example, a computer, connected to receive input from a user input and one or more sensors and an output connected to a display for displaying thereon two or more graphs having traces that are associated with the outputs of the sensors over time.

With reference to FIG. 1, a process control device 2, such as a programmable logic controller or a computer, is connected to receive signals from sensors S1–S8 which are configured to measure process parameters, such as temperature, pressure, pH, conductivity, etc., of a manufacturing process. Process control device 2 is connected to one or more control means (not shown) for controlling the manufacturing process in a manner known in the art as a function of the signals output by sensors S1–S8.

Process control device 2 has a display driver output connected to a display 4. Process control device 2 includes software that is utilized to control display 4 in a manner known in the art to produce thereon two or more graphs. In FIG. 1, process control device 2 causes the display 4 to display a first graph 6 and a second graph 8. First graph 6 includes a horizontal time axis 10, a vertical unit axis W on the left side of first graph 6, and a vertical unit axis X on the right side of first graph 6. Second graph 8 includes a horizontal time axis 12, a vertical unit axis Y on the left side of second graph 8, and a vertical unit axis Z on the right side of second graph 8.

Process control device 2 is configured to receive, via a user input 14, operator or user commands. One such set of commands includes the selection of a set of sensors, e.g., S1–S8, in a user selected order. In response to selecting the set of sensors S1–S8, process control device 2 produces on first graph 6, and/or second graph 8 a set of traces, e.g., traces T1–T8, corresponding to changes in the signals output by the set of sensors S1–S8, respectively, over time. In the prior art, the sensor output to be displayed by a trace on the first graph 6 or the second graph 8 is selected manually. A problem with such manual selection is that the software utilized to form the traces on each graph selects for the scale or unit of measure of the vertical axis of each graph, the unit of measure having the largest magnitude. For example, if the unit of measure for a first trace displayed on a graph has a magnitude of $10^6$, e.g., conductivity, and the units of measure for remaining traces of the same graph have a magnitude on the order of $10^1$, the horizontal axis of the graph would be scaled to the magnitude of the first trace. Variations of this first trace over time would appear on the graph as changes in the vertical position of the trace over time. To the contrary, however, the traces other than the first trace would essentially appear as straight lines on or adjacent the horizontal time axis of the graph. To overcome this problem, the present invention receives input regarding which sensor output is to be plotted by process control device 2 as a trace on the first graph 6 or second graph 8. In addition, process control device 2 also receives for each sensor information regarding the unit of measure, e.g., temperature, pressure, pH, conductivity, etc., detected by each selected sensor. FIG. 2a shows an exemplary user input of sensor numbers and associated units of measure and the order in which the sensor numbers are received in process control device 2.

With reference to FIG. 2b, and with continuing reference to FIGS. 1 and 2a, after receipt of the sensor numbers and the associated units of measure shown in FIG. 2a, process control device 2 arranges the sensors into groups 14, 16 and 18 according to the unit of measure associated with each group. Next, process control device 2 orders the groups in descending order according to the number of sensors in each group. If two or more groups have the same number of sensors associated therewith, these groups are ordered in descending order according to the units of measure associated with the order that the sensors were received in process control device 2. In the example shown in FIGS. 2a and 2b, unit of measure B was associated with sensor S3 before unit of measure C was associated with sensor S4. Since sensor S3 was received by process control device 2 before sensor S4, group 16, associated with unit of measure B for sensors S3 and S6, is listed in the descending order in FIG. 2b before group 18, associated with unit of measure C for sensors S4 and S7. Next, process control device 2 causes the unit of measure A associated with group 14 to be assigned to unit axis W of first graph 6 and causes each sensor in group 14 to be associated with a trace of first graph 6. Preferably, the number of traces displayed on first graph 6 is limited by process control device 2 to provide sufficient spacing and resolution among the displayed traces. In FIG. 1, the first graph 6 and the second graph 8 each display four traces. However, this is not to be construed as limiting the present invention. In the example shown in FIGS. 2a and 2b, the output of sensors S1, S2, S5 and S8 are associated with traces T1, T2, T3 and T4, respectively, and unit of measure A of group 14 is associated with unit axis W of first graph 6. Since traces T1–T4, i.e., all of the traces of first graph 6, are associated with unit axis W, unit axis X of first graph 6 is not associated with a unit of measure received by process control device 2.

With ongoing reference to FIG. 2b, sensors S3 and S6 are next associated with traces T5 and T6 and unit of measure B is associated with unit axis Y of second graph 8. Similarly, sensors S4 and S7 are associated with trace numbers T7 and T8 and unit of measure C is associated with unit axis Z of second graph 8.

Once the foregoing assignment is complete, process control device 2 forms on first graph 6 traces T1–T4 corresponding to the output of sensors S1, S2, S5 and S8, respectively, with unit axis W configured to display unit of measure A. Similarly, process control device 2 forms on second graph 8 traces T5–T8 corresponding to the output of sensors S3, S6, S4 and S7, respectively, with unit axis Y configured to display unit of measure B and with unit axis Z configured to display unit of measure C.

Referring now to FIGS. 3a and 3b, and with continuing reference to FIG. 1, in response to receiving the user input shown in FIG. 3a, process control device 2 organizes the sensors into groups 20, 22 and 24 according to their respective units of measure and orders the groups in descending order according to the number of sensors associated with each group. The example shown in FIG. 3b is similar to the example shown in FIG. 2b, except that the number of sensors associated with unit of measure C is listed first in the descending order of groups because the number of sensors associated with unit of measure C is greater than the number of sensors associated with unit of measure A or unit of measure B. In the example shown in FIG. 3b, sensors S4, S5, S7 and S8 are associated with traces T1, T2, T3 and T4 of first graph 6 and unit of measure C is associated with unit axis W of first graph 6. Sensors S1 and S2 are associated with traces T5 and T6, respectively, of second graph 8 and unit of measure A is associated with unit axis Y of second graph 8. Lastly, sensors S3 and S6 are associated with trace T7 and T8, respectively, of second graph 8 and unit of measure B is associated with unit axis Z of second graph 8.

With reference to FIGS. 4a and 4b, and with continuing reference to FIG. 1, in response to the user input shown in FIG. 4a, process control device 2 organizes the sensors into groups 26, 28, 30 and 32 according to the unit of measure associated with each sensor. In addition, process control device 2 organizes the groups in descending order according to the number of sensors associated with each group and, as necessary, according to the units of measure associated with the order that the sensors were received by process control device 2.

As shown in FIG. 4b, sensors S1, S3 and S8, i.e., the sensors associated with unit of measure A, are associated with traces T1, T2 and T3, respectively, and unit of measure A is associated with unit axis W of first graph 6. Listed next in the descending order of groups is group 28 which includes sensors S2 and S4, both associated with unit of measure C. Since the first graph 6 can display only four traces, e.g., T1–T4; and since traces T1–T3 are already associated with sensors S1, S3 and S8, sensors S2 and S4 associated with unit of measure C cannot be displayed together on first graph 6. In accordance with the present invention, except for a certain condition to be described hereinafter, process control device 2 avoids displaying two or more sensors associated with the same unit of measure on different graphs 6, 8. Accordingly, process control device 2 associates sensors S2 and S4 with traces T5 and T6 of second graph 8 and causes unit of measure C to be associated with unit axis Y. Similarly, process control device 2 associates sensors S6 and S7 with traces T7 and T8 and causes unit of measure D to be associated with unit axis Z.

As discussed above, process control device 2 organizes the user selected sensors into groups according to the unit of measure associated with each sensor and organizes the groups in descending order according to the number of sensors associated with each group. Following this organization, group 32 consisting of sensor S5 associated with unit of measure B is the final group in the descending order of groups. In accordance with the present invention, however, since trace T4 and unit axis X of first graph 6 are available, process control device 2 associates sensor S5 with trace T4 and causes unit of measure B to be associated with unit axis X.

Thus, as shown in FIGS. 4a and 4b, process control device 2 maintains groups of sensors associated with the same unit of measure together for display purposes and utilizes the available traces T1–T8 of first graph 6 and second graph 8 to maximize the use of the unit axes W, X, Y and Z.

With reference to FIGS. 5a and 5b, and with continuing reference to FIG. 1, in response to the user input shown in FIG. 5a, process control device 2 organizes the sensors into groups 34, 36, 38 and 40 according to the unit of measure associated with each sensor and organizes the groups in descending order according to the number of sensors associated with each group. In accordance with the present invention, groups having a large number of sensors associated therewith are presumed to be more important than groups having a lesser number of sensors associated therewith. Thus, as shown in FIG. 5b, process control device 2 will associate a group having a large number of sensors with traces of first graph 6 and/or second graph 8, with each sensor associated with a unit of measure being associated with a trace in the order in which the sensor is listed in the group. Thus, for example, group 34 includes sensors S1, S4, S5, S6 and S8. Since first graph 6 displays only traces T1–T4, sensors S1, S4, S5 and S6 are associated with traces T1–T4, respectively, and process control device 2 causes unit of measure A to be displayed on unit axis W. Moreover, process control device 2 causes sensor S8 to be associated with trace T5 of second graph 8 and causes unit of measure A to be displayed on unit axis Y. Since all of the traces T1–T4 of first graph 6 are utilized, and since unit axis Y of second graph 8 is already utilized, only sensors associated with one additional unit of measure can be displayed. In the example shown in FIG. 5b, groups 36, 38 and 40 each have only one sensor and one unit of measure associated therewith. Recall that the order of the sensors shown in FIG. 5b is based on the unit of measure associated with each sensor and the order the sensors were received by process control device 2. If two or more groups have the same number of sensors associated with their respective units of measure, the order of these two or more groups in the descending order is based upon the order in which the sensor associated with the unit of measure is received by process control device 2. In the example shown in FIGS. 5a and 5b, sensor S2 was received by process controller device 2 before sensors S3 and S7. Hence, in the descending order shown in FIG. 5b, sensor S2 appears after the sensors associated with unit of measure A, sensor S3 appears after sensor S2, and sensor S7 appears after sensor S3.

In the example shown in FIGS. 5a and 5b, sensor S2 is associated with trace T6 of second graph 8 and process control device 2 causes unit of measure B to be displayed on unit axis Z. Since all of the available traces T1–T4 of first graph 6 are utilized, and since unit axes Y and Z of second graph 8 are associated with units of measure A and B, respectively, sensor S3 associated with unit of measure D and sensor S7 associated with unit of measure C cannot be displayed without exceeding the maximum number of traces associated with first graph 6 or without having to have unit axis Y and/or unit axis Z be associated with more than one unit of measure. Hence, the present invention does not associate sensor S3 or sensor S7 with a trace, e.g., trace T7 or T8.

With reference to FIGS. 6a and 6b, in response to receiving the input shown in FIG. 6a, process control device 2 organizes the sensors into groups 42, 44 and 46 according to the unit of measure associated with each sensor and organizes the groups in descending order in the manner described above. In the example shown in FIG. 6b, sensors S1, S3 and S4 associated with unit of measure A are associated with trace numbers T1, T2 and T3, respectively, and process control device 2 causes unit of measure A to be associated with unit axis W. In addition, sensors S2, S6 and S7 are associated with trace numbers T5, T6 and T7, respectively, and process control device 2 causes unit of measures B to be associated with unit axis Y. However, sensors S5 and S8 associated with unit of measure C are not associated with a trace of first graph 6 or second graph 8 since doing so would require separating the members of group 46 between first graph 6 and second graph 8, with each graph only displaying one trace associated with one sensor for unit of measure C. The method of the present invention can avoid separating members of a group between first graph 6 and second graph 8 unless the number of sensors associated with the unit of measure is greater than the number of traces that can be displayed on first graph 6 or second graph 8, such as in the example shown in FIG. 5b.

With reference to FIGS. 7a and 7b, in response to the user input shown in FIG. 7a, process control device 2 arranges the sensors into groups 48, 50, 52 and 54 according to the unit of measure associated with each group and organizes the groups in descending order in the manner described above. In FIG. 7b, sensors S1, S7 and S8 are associated with trace numbers T1, T2 and T3, respectively, and process control device 2 causes unit of measures B to be associated with unit axis W of first graph 6. Similarly, sensors S2, S4 and S5 are associated with traces T5, T6 and T7, respectively, of second graph 8 and process control device 2 causes unit of measure B to be associated with unit axis Y. Since sensors S3 and S6 are exclusively associated with units of measure C and D, respectively, and since traces T4 and T8 in first and second graphs 6 and 8 are still available, process control device 2 associates sensors S3 and S6 with traces T4 and T8 and associates units of measure C and D with unit axes X and Z, respectively. Unlike the example shown in FIG. 6b, the example shown in FIG. 7b can make full use of the display capacity of first graph 6 and second graph 8 because first graph 6 and second graph 8 have available a sufficient number of traces for association with the sensors associated with each unit of measure.

Once the association of sensor numbers and their corresponding units of measure to traces of graphs 6, 8 and their corresponding unit axes is complete, process control device 2 causes traces related to the output of corresponding sensors to be displayed on first graph 6 and/or second graph 8 of display 4.

While described above in connection with user selection of sensors S1–S8, the number of sensors and the user selection of all or part of the available sensors for display by traces of first graph 6 and/or second graph 8 of display 4 is not to be construed as limiting the invention.

Moreover, although the invention is described in terms of a method of generating traces on two graphs, it should be appreciated that traces can be generated on more than two graphs and displayed depending on the units of measure selected and the number of sensors. Specifically, in the example shown in FIGS. 5a and 5b, process control device 2 can associate sensor S3 with a trace of a third graph (not shown) and can cause unit of measure D to be displayed on a first unit axis of the third graph. Moreover, sensor S7 can be associated with another trace of the third graph and unit of measure C can be associated with another unit axis of the third graph. Furthermore, in the examples shown in FIGS. 6a and 6b, process control device 2 associates sensors S5 and S8 with traces of a third graph and causes unit of measure C to be displayed on a unit axis of the third graph.

Furthermore, it should be appreciated that although the invention is described in terms of a method of generating traces on two graphs, in the instance where there is only two groups of sensors and the total number of sensors in both groups is less than or equal to the number of traces available on a graph, the method of the present invention is capable of displaying the outputs of the sensors on one graph.

The invention has been described with reference to the preferred embodiment. Obvious modifications and alterations will occur to others upon reading and understanding the preceding detailed description. It is intended that the invention be construed as including all such modifications and alterations insofar as they come within the scope of appended claims or the equivalents thereof.

I claim:

1. A method of displaying outputs of a plurality of process sensors on a visual display capable of visually displaying two or more graphs, the method comprising the steps of:

(a) selecting in a desired order a plurality of sensors having outputs that are capable of being displayed by traces of two or more graphs of a visual display, where the plurality of sensors selected is greater than the plurality of traces that can be displayed by each graph alone;

(b) associating a unit of measure with each selected sensor;

(c) grouping the sensors according to the units of measure;

(d) associating an axis of one graph with the unit of measure of one group of sensors;

(e) associating outputs of the sensors of the one group of sensors with traces of the one graph;

(f) associating an axis of another graph with the unit of measure of another group of sensors;

(g) associating outputs of the sensors of the other group of sensors with traces of the other graph; and (h) displaying traces associated with the outputs of the sensors on the graphs with respect to time.

2. A method of displaying outputs of a plurality of process sensors on two or more graphs of a visual display, the method comprising the steps of:

(a) selecting in a desired order a plurality of sensors having outputs that are to be displayed by traces of two or more graphs of a visual display, with the plurality of sensors selected being greater than the plurality of traces that can be displayed by each graph alone;

(b) associating a unit of measure with each selected sensor;

(c) grouping the sensors according to the units of measure;

(d) associating a first axis of a first graph with the unit of measure of a first group of sensors;

(e) associating outputs of the sensors of the first group of sensors with traces of the first graph;

(f) associating a first axis of a second graph with the unit of measure of a second group of sensors;

(g) associating outputs of the sensors of the second group of sensors with traces of the second graph; and (h) displaying traces associated with the outputs of the sensors on the first and second graphs with respect to time.

3. The method as set forth in claim 2, wherein in step (c), each sensor in a group is ordered therein according to the order it was selected in step (a).

4. The method as set forth in claim 2, further including the steps of:

when the number of sensors of a third group of sensors is less than or equal to the number of traces of the first graph not associated with outputs of the sensors of the first group of sensors, associating a second axis of the first graph with the unit of measure associated with the third group of sensors; and associating outputs of the sensors of the third group of sensors with traces of the first graph not associated with outputs of the sensors of the first group of sensors.

5. The method as set forth in claim 4, further including the steps of:

when the number of sensors of a fourth group of sensors is less than or equal to the number of traces of the second graph not associated with outputs of the sensors of the second group of sensors, associating a second axis of the second graph with the unit of measure associated with the fourth group of sensors; and associating outputs of the sensors of the fourth group of sensors with traces of the second graph not associated with outputs of the sensors of the second group of sensors.

6. The method as set forth in claim 2, further including the steps of:

when the number of sensors of a third group of sensors is less than or equal to the number of traces of the second graph not associated with outputs of the sensors of the second group of sensors, associating a second axis of the second graph with the unit of measure associated with the third group of sensors; and associating outputs of the sensors of the third group with traces of the second graph not associated with the outputs of the sensors of the second group.

7. The method as set forth in claim 2, further including the steps of:

when the number of sensors of the first group of sensors exceeds the number of traces that can be displayed on the first graph, associating a second axis of the second graph with the unit of measure of the first group of sensors; and associating outputs of the sensors of the first group of sensors with traces of the second graph not associated with outputs of the sensors of the second group of sensors.

8. The method as set forth in claim 7, wherein the number of traces of the second graph associated with outputs of the sensors of the second group of sensors is less than or equal to a difference between (i) a total number of traces displayable on the second graph and (ii) the number of traces of the second graph associated with outputs of the sensors of the first group of sensors.

9. The method as set forth in claim 2, wherein each grouping of sensors includes at least one sensor.

10. A method of ordering and displaying the outputs of a plurality of process sensors on a plurality of time-based graphs displayed on a visual display, the method comprising the steps of:

(a) displaying on a visual display a plurality of graphs with each graph capable of displaying a plurality of traces;

(b) generating a list of sensors, where the number of sensors generated is greater than the plurality of traces displayable by each graph alone;

(c) associating with each sensor in the list a unit of measure each sensor is configured to detect;

(d) grouping the sensors in the list according to units of measure;

(e) associating at least one axis of each graph with the unit of measure of a group of sensors;

(f) associating a number of the plurality of traces of each graph with a like number of sensors of a group of sensors; and (g) displaying on each of the plurality of graphs with respect to time, the traces corresponding to the outputs of the associated sensors.

11. A method of ordering and displaying the outputs of a plurality of process sensors on a plurality of time-based graphs displayed on a visual display, the method comprising the steps of:

(a) displaying on a visual display a first graph and a second graph, with the first graph and the second graph capable of displaying a first plurality of traces and a second plurality of traces, respectively;

(b) generating a list of sensors, where the number of sensors generated is greater than the plurality of traces displayable by each graph alone;

(c) associating with each sensor in the list a unit of measure each sensor is configured to detect;

(d) grouping the sensors in the list according to units of measure;

(e) associating a first axis of the first graph with the unit of measure of a first group of sensors;

(f) associating a first number of the first plurality of traces with a like number of sensors of the first group of sensors;

(g) associating a first axis of the second graph with the unit of measure of a second group of sensors;

(h) associating a second number of the second plurality of traces with a like number of sensors of the second group of sensors; and (i) displaying on the first and second graphs with respect to time, traces corresponding to the outputs of the associated sensors.

12. The method as set forth in claim 11, wherein in step (d) each sensor in a group of sensors is listed therein according to the order it was listed in the list of sensors.

13. The method as set forth in claim 11, further including the steps of:

associating a second axis of the first graph with the unit of measure of a third group of sensors; and associating a second number of the first plurality of traces with a like number of sensors of the third group of sensors.

14. The method as set forth in claim 13, wherein the sum of the first number of the first plurality of traces and the second number of the first plurality of traces equals the total of the first plurality of traces.

15. The method as set forth in claim 13, further including the steps of:

associating a second axis of the second graph with the unit of measure of a fourth group of sensors; and associating a second number of the second plurality of traces with a like number of sensors of the fourth group of sensors.

16. The method as set forth in claim 15, wherein the sum of the first number of the second plurality of traces and the second number of the second plurality of traces equals the total of the second plurality of traces.

17. The method as set forth in claim 11, further including the steps of:

associating a second axis of the second graph with the unit of measure of a third group of sensors; and associating a second number of the second plurality of traces with a like number of sensors of the third group of sensors.

18. The method as set forth in claim 11, wherein each grouping of sensors includes at least one sensor.

19. A method of plotting traces of data on two or more graphs, wherein each trace is related to the output of a process sensor, the method comprising the steps of:

(a) generating a list of sensors, where the number of sensors generated is greater than a number of traces displayable on each graph alone;

(b) grouping the sensors according to a unit of measure each sensor is configured to detect;

(c) associating one axis of a first graph with the unit of measure of a first group of sensors;

(d) associating each sensor of the first group with a trace to be displayed on the first graph;

(e) associating one axis of a second graph with the unit of measure of a second group of sensors;

(f) associating each sensor of the second group with a trace to be displayed on the second graph; and (g) displaying traces on the first and second graphs, wherein each trace is related to the output of a sensor over time.

20. The method as set forth in claim 19, further including the step of associating a unit of measure with each sensor in the list, with the associated unit of measure for each sensor in the list corresponding to the unit of measure it is configured to detect.

21. The method as set forth in claim 19, further including the steps of:

associating another axis of the first graph or the second graph with the unit of measure of a third group of sensors; and associating each sensor of the third group with a trace produced on the first graph or a trace produced on the second graph that is not already associated with a sensor of the first group or a sensor of the second group, respectively.

22. The method as set forth in claim 19, further including the steps of:

when the number of sensors of the first group of sensors exceeds the number of traces that can be displayed on the first graph, associating a second axis of the second graph with the unit of measure of the first group of sensors; and associating outputs of the sensors of the first group of sensors with traces of the second graph not associated with outputs of the sensors of the second group of sensors.

* * * * *